United States Patent
Meiller et al.

[11] Patent Number: 5,502,284
[45] Date of Patent: Mar. 26, 1996

[54] SEAT PLATE ASSEMBLY

[75] Inventors: Hermann Meiller, Amberg; Richard Ott, Kümmersbruck; Walter Mertel, Sulzbach-Rosenberg, all of Germany

[73] Assignee: Grammer AG, Amberg, Germany

[21] Appl. No.: 398,927

[22] Filed: Mar. 6, 1995

[30] Foreign Application Priority Data

Mar. 14, 1994 [DE] Germany ............... 44 08 481.1

[51] Int. Cl.⁶ ............... H01H 3/14; B60K 28/00
[52] U.S. Cl. ............... 200/85 A; 180/273; 200/573
[58] Field of Search ............... 340/666, 667; 307/10.1; 180/273; 200/85 R, 85 A, 61.58 R, 61.7, 330, 336, 573, 574

[56] References Cited

U.S. PATENT DOCUMENTS

| | | | |
|---|---|---|---|
| 1,675,465 | 7/1928 | Roehrich | 200/85 A |
| 2,572,521 | 10/1951 | Rogers | 200/85 A |
| 3,703,618 | 11/1972 | Lewis . | |
| 4,075,443 | 2/1978 | Fatur . | |
| 4,361,241 | 11/1982 | Leskoverc | 200/85 A |
| 4,378,058 | 7/1987 | Wooters . | |
| 5,124,512 | 6/1992 | Huettner et al. . | |
| 5,162,626 | 11/1992 | Hutchison | 200/85 A |

FOREIGN PATENT DOCUMENTS 4023350 1/1992 Germany .

*Primary Examiner*—Gerald P. Tolin
*Attorney, Agent, or Firm*—Elliot M. Olstein; Raymond J. Lillie

[57] ABSTRACT

A seat plate assembly intended more particularly for the driving seat of a commercial vehicle has a base portion and seat cushioning thereon. Between the base portion and the seat cushioning is a flat operating element with which a switching device can be actuated by way of an operatively interposed elongate actuating member for switching a functional device of the vehicle on or off in dependence on weight on the seat. The operating element is provided at its underside with at least one drive portion with which the elongate actuating member is displaced in its longitudinal direction towards the switch when the seat plate assembly is loaded with a weight, whereby the switch is actuated. Connected to the elongate actuating member is a spring which is mechanically stressed when said displacement movement occurs.

5 Claims, 2 Drawing Sheets

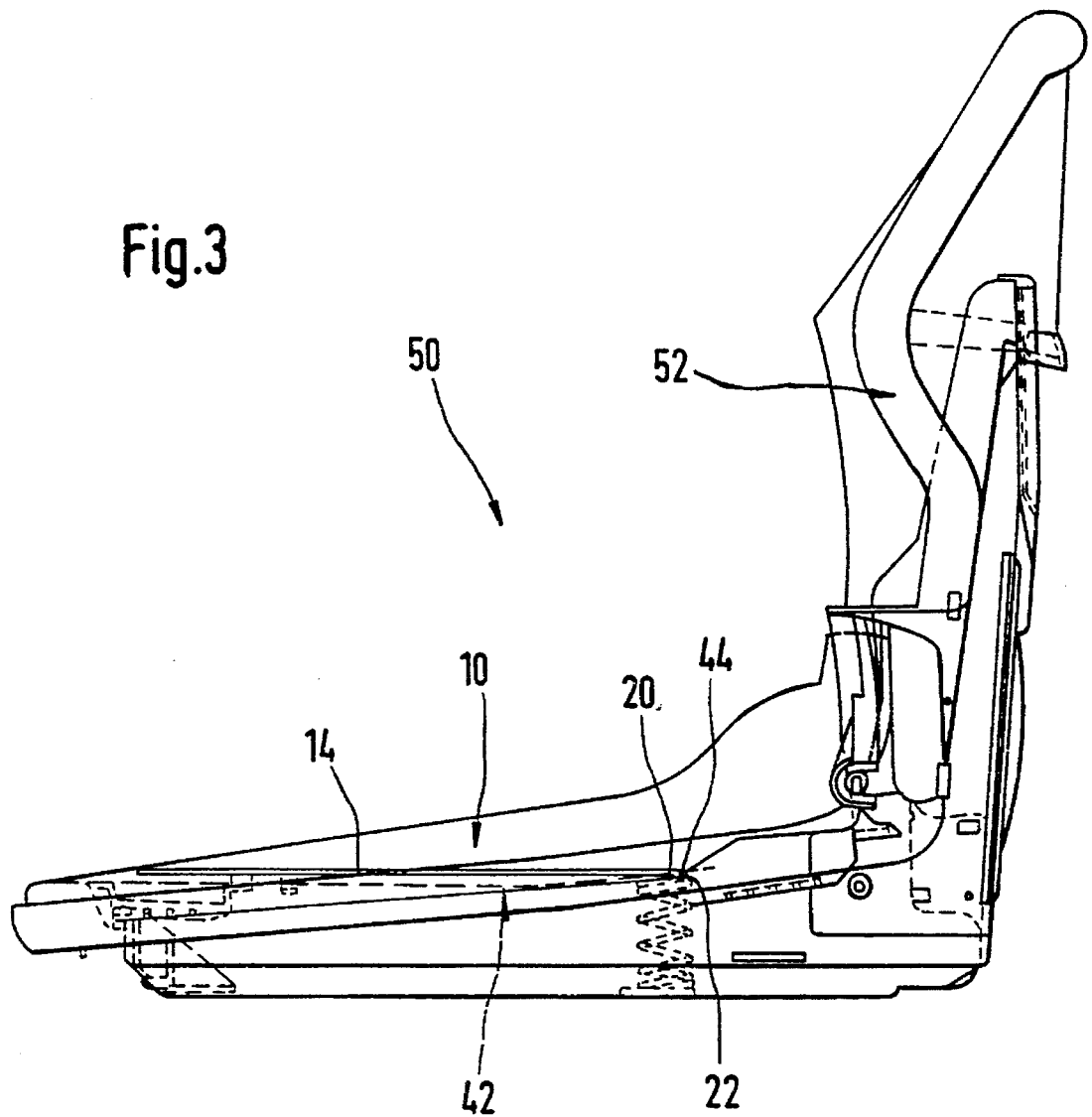

SEAT PLATE ASSEMBLY

FIELD OF THE INVENTION

The invention generally concerns a seat plate assembly which is intended more particularly for the driving seat of a vehicle such as a commercial vehicle. The seat plate assembly therefore constitutes the horizontal seat portion, or squab portion, of the seat.

BACKGROUND OF THE INVENTION

One form of seat plate assembly or squab arrangement, for the driving seat of a commercial vehicle, comprises a base portion and a seat cushion which is disposed on the base portion. Resiliently movably disposed between the base portion and the seat cushion is a flat operating element adapted to actuate a switching means for switching on a functional device of the vehicle upon a given minimum weight loading on the seat plate assembly and switching off the functional device when the seat plate assembly is relieved of load. The actuating movement imparted to the operating element is transmitted to the switching means by way of an elongate actuating member. Such a design configuration is disclosed in U.S. Pat. No. 5,124,512.

In that seat plate assembly, the flat operating element is connected to the base portion of the assembly, by means of at least one elastically resilient connecting portion. For that purpose, fixed to the flat operating element is a U-shaped member having two limb portions which are spaced from each other and which each project beyond the flat operating element with an end part, thereby forming the elastically resilient connecting portion. That however requires the U-shaped member to be mounted on the operating element.

U.S. Pat. No. 4,678,058 discloses a seat plate assembly or a vehicle seat having an operating element for actuation of a switching device. The operating element is in the form of a spring loop member, the limbs of which are designed to actuate the switching device. However, such a seat is sensitive to a weight loading thereon, only over a comparatively small surface area thereof. A similar consideration applies in regard to the vehicle seat disclosed in U.S. Pat. No. 3,703,618 in which the operating element for actuating a switching device is for example in the form of a spring wire bent in a meander-like configuration. A seat plate assembly with an operating element for actuating a switching device, with the operating element also being in the form of a spring wire bent in a meander-like configuration, is disclosed in U.S. Pat. No. 4,075,443.

SUMMARY OF THE INVENTION

An object of the present invention is to provide a seat plate assembly, in particular for the driving seat of a commercial vehicle, which is responsive to a weight on the seat to produce a switching action, with an enhanced level of sensitivity, while being of a simplified design configuration.

Another object of the present invention is to provide a seat plate assembly for a driving seat of a vehicle, including a switch adapted to control a functional device forming part of the equipment of the vehicle, wherein the assembly affords reliability of operation in combination with simplicity of structure.

Still another object of the present invention is to provide a seat assembly incorporating a switch for controlling a functional device forming part of equipment operatively associated with the seat, involving a relatively small number of movable components performing simple movements with a low susceptibility to wear.

In accordance with the present invention the foregoing and other objects are attained by a seat plate assembly for a vehicle, for example for the driving seat of a commercial vehicle, comprising a base portion and seat cushion means on the base portion. An at least substantially flat operating element is resiliently movably disposed between the base portion and the seat cushion means and a switching means is actuable by the operating element for operating a functional device of the vehicle, as for switching on the device upon a given minimum weight loading on the assembly and switching off the device when the assembly is relieved of load. At its underside the operating element has at least one drive portion which provides at least one inclined or wedge actuating surface. The assembly further includes an elongate actuating member for operating the switching means, having at least one opening co-operable with the actuating surface of the drive portion, whereby the drive portion which is urged downwardly under a weight loading on the assembly presses with its actuating surface against the corresponding edge of the opening in the elongate actuating member and thereby displaces the elongate actuating member in the longitudinal direction thereof to actuate the switching means. A spring means is connected to the elongate actuating member and is adapted to be mechanically stressed when that displacement movement occurs.

It will be noted here that the functional device as referred to herein denotes a device forming part of the equipment of the vehicle such as a motor vehicle in which the seat plate assembly according to the invention is used, wherein the operational condition of the functional device is dependent on the presence or absence of a weight loading on the seat of the vehicle. The functional device can thus be switched from a first condition into a second condition when a weight loading is applied to the seat, and switched back into the first condition again when the weight loading is removed from the seat.

It will be seen that the above-mentioned drive portion cooperates with the elongate actuating member by way of the taper or wedge-like actuating surface, through the taper angle thereof, in such a way as to provide a suitable transmission action as between the movement of the drive portion and the resulting movement of the actuating member. That can provide for optimum switching sensitivity, in an advantageous fashion.

The taper angle of the above-mentioned actuating surface and the associated opening in the elongate actuating member are dimensioned in such a way that a self-locking action as between the drive portion and the actuating member, which could easily result in the arrangement jamming, is reliably excluded.

In accordance with a preferred feature of the invention, the operating element is mounted to the base portion pivotably movably relative thereto about a pivot axis which is oriented in the transverse direction of the seat. A further spring means is disposed between the base portion and the operating element, while the elongate actuating member is spaced from said pivot axis and is arranged in at least approximately parallel orientation therewith beneath the operating element. That affords an assembly which is generally easy to assemble.

The further spring means disposed between the base portion and the operating element may preferably be at least one coil compression spring which can be located between the base portion and the operating element by virtue of those components being of a suitable configuration for that purpose. A spring means of such a configuration is then still at least limitedly operational even if the at least one coil compression spring should suffer failure or breakage. Such a spring means can also be selected to afford a desired springing characteristic for the seat.

In accordance with another preferred feature of the invention, to provide the above-mentioned pivot axis, the operating element has at least first and second tongue portions which are aligned with each other in the transverse direction of the assembly while the base portion has recesses or openings which are aligned with each other in the transverse direction of the assembly, for insertion therein of the tongue portions. In that case the pivot axis about which the operating element is pivotable in relation to the base portion is defined by the tongues and openings. The openings are desirably holes which are provided in the base portion, but it would be possible for the openings to be formed by depressions in the base portion.

Another preferred feature of the invention provides that the elongate actuating member is linearly movably guided on the base portion, and the switching means, in the projection of the operating element on to the base portion, is arranged laterally beside the operating element on the base portion. It will be appreciated that it would also be possible for the elongate actuating member and the switching means to be appropriately arranged on the flat operating element. That configuration of the assembly according to the invention provides for a reliable mode of operation thereof, by virtue of the simplicity of structure and the movements involved.

Further objects, features and advantages of the present invention will be apparent from the following description of a preferred embodiment of a seat plate assembly according to the invention and a preferred embodiment of a driving seat for a commercial vehicle having such an assembly.

BRIEF DESCRIPTION OF THE DRAWING

FIG. 3 is a side view of a driving seat for a commercial vehicle having an assembly as shown in FIG. 2.

DESCRIPTION OF PREFERRED EMBODIMENTS

Figure 1:
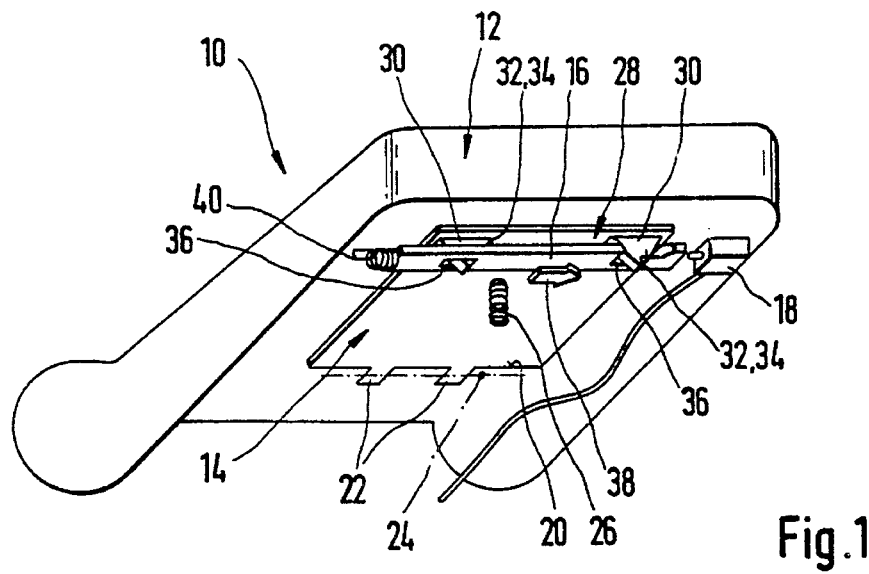
FIG. 1 is a diagrammatic view of a seat plate assembly according to the invention viewing from below, without however illustrating the base portion of the assembly in order clearly to show the mode of operation of the flat operating element and the elongate actuating member of the assembly.

Referring firstly to FIG. 1, shown therein is a perspective view from below of a seat plate assembly 10 in accordance with the invention, which is intended more particularly for the driving seat of a vehicle such as a commercial vehicle. FIG. 1 shows the assembly 10 without a base portion which is indicated at 42 in FIG. 3, in order by virtue of such omission more clearly to illustrate a flat operating element 14 disposed between the base portion and a seat cushion 12 of the assembly 10, and also an elongate actuating member 16 which is disposed beneath the operating element 14 and which is actuable by means of the operating element 14.

The assembly 10 includes a switching device 18 which may be for example an electrical microswitch. The elongate actuating member 16 serves to actuate the switching device 18 for switching a functional device of the vehicle in which the assembly 10 is used, between a first condition and a second condition. As indicated above, the functional device may be any appropriate item of equipment on board the vehicle, and the device may be switched on or off by means of the switching device 18 when the latter is actuated by the elongate actuating member 16.

The operating element 14 is provided at its one transverse edge as indicated at 20, with first and second tongues 22 which are spaced from each other and which are aligned with each other in the transverse direction of the seat. The tongues 22 and associated openings in the base portion of the assembly 10, into which the tongues 22 of the operating element 14 are inserted, co-operate to define a pivot axis 24 which is indicated in FIG. 1 by a thin dash-dotted line and about which the flat operating element 14 is pivotable in relation to the base portion (not shown in FIG. 1).

The assembly further includes a spring arrangement as diagrammatically indicated at 26 in FIG. 1, operatively disposed between the base portion (not shown) and the operating element 14, the spring arrangement 26 providing for relative mobility of the operating element 14 relative to the base portion of the assembly 10. The spring arrangement 26 may comprise one or more compression coil springs.

At the transverse edge portion 28 which is disposed opposite the transverse edge 20 and which is therefore towards the front of the assembly 10, the operating element 14 is provided with drive portions 30 which project from the operating element 14 at the underside thereof. Each drive portion 30 has a taper or wedge actuating surface 32 with which the corresponding drive portion 30 bears against an edge portion 34 of an opening 36 in the elongate actuating member 16. In FIG. 1, the elongate actuating member 16 is shown as cut away in the vicinity of the right-hand opening 36, in order more clearly to show the associated drive portion 30 with its taper actuating surface 32.

It will be seen from the foregoing description and the illustration in FIG. 1 that, when a load is applied to the seat plate assembly 10, as by a person sitting on the seat, the operating element 14 is pivoted downwardly about the pivot axis 24, towards the base portion (not shown). When that movement occurs, the elongate actuating member 16 is moved by means of the drive portions 30 and more specifically by the co-operation of the actuating surfaces 32 of the drive portions 30 with the openings 36 in the elongate actuating member 16, in the longitudinal direction of the actuating member 16, that is to say in the direction indicated by the arrow 38 towards the switching device 18. In that way, the switching device 18 is actuated by being switched from one condition thereof into another, when the assembly 10 is subjected to a given minimum weight loading thereon. Actuation of the switching device 18 in that way will thus appropriately switch the above-mentioned functional device of the vehicle in which the seat is installed. Simultaneously with actuation of the switching device 18, a spring means 40 which is connected to the elongate actuating member 16 is mechanically stressed when the displacement of the actuating member 16 takes place.

When the assembly 10 is relieved of load again, the spring arrangement 26 operatively disposed between the base portion (not shown in FIG. 1) and the operating element 14 urges the operating element 14 upwardly about the pivot axis 24 and away from the base portion of the assembly again, so that the spring arrangement 26 is thus relieved of stress. As a result of that upward pivotal movement of the operating element 14, the drive portions 30 are moved upwardly out of the corresponding openings 36 in the elongate actuating member 16 and the latter is thus moved by the force of the spring means 40 in the opposite direction to the direction indicated by the arrow 38, and thus moves away from the switching device 18 again. The switching device 18 thus switches the above-mentioned functional device back into its previous condition to provide the appropriate control action in that respect.

Figure 2:
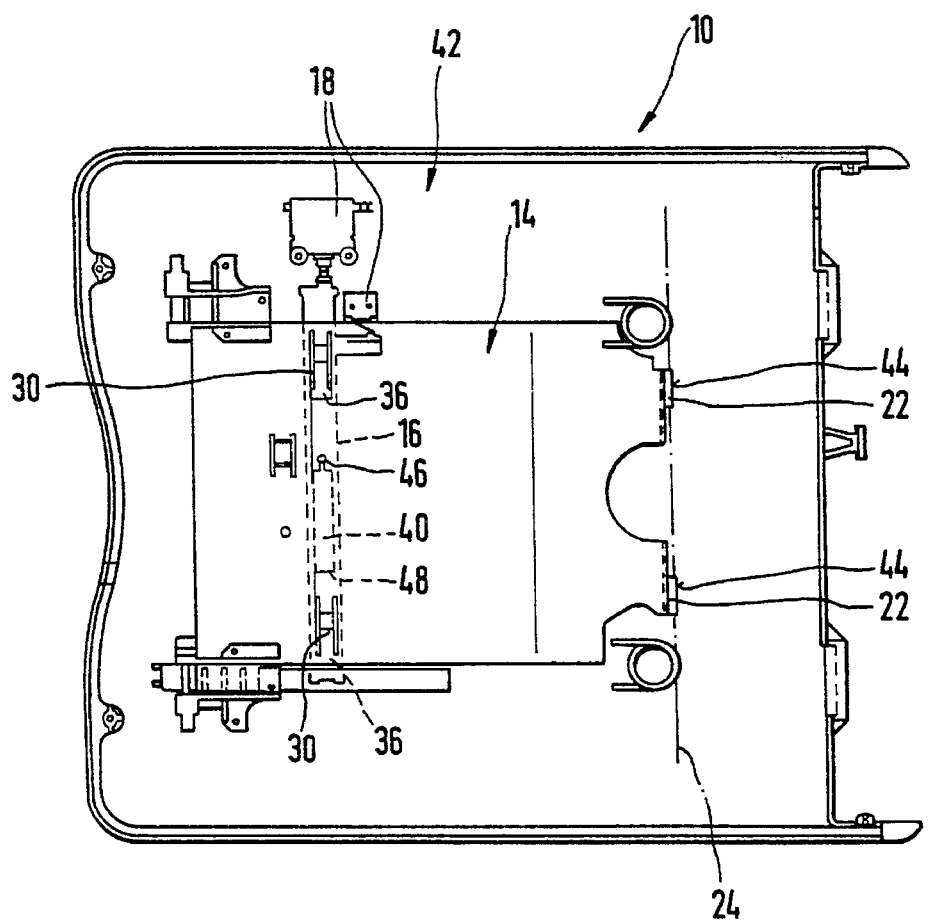
FIG. 2 is a plan view of an embodiment of the seat plate assembly according to the invention, without however illustrating the cushioning of the assembly.

Reference will now be made to FIG. 2 showing a plan view of a configuration of the seat plate assembly 10, with the seat cushion indicated at 12 in FIG. 1 not being shown in FIG. 2 in order thereby to show the base portion 42 of the assembly 10. The base portion 42 is provided with the above-mentioned openings for receiving the tongues 22, the openings being indicated at 44 in FIG. 2 and being spaced from each other and aligned with each other in the transverse direction of the seat. The tongues 22 on the operating element 14 are loosely disposed in the openings 44 so that, as indicated above, the tongues 22 on the operating element 14, which are aligned with each other in the transverse direction of the seat, and the openings 44 in the base portion 42, co-operate to define the pivot axis 24 which is oriented in the transverse direction of the seat and about which the operating element 14 is pivotably movably mounted relative to the base portion 42.

It can be clearly seen from FIG. 2 that the elongate actuating member 16 is arranged beneath the operating element 14, in the transverse direction of the assembly 10, and is guided for linear movement on the base portion 42. The spring means 40 is fixed by its one fixing end 46 to the elongate actuating member 16 and by its second fixing end 48 to the base portion 42. The elongate actuating member 16 is provided with the first and second openings 36 into which extend the drive portions 30 which project downwardly from the operating element 14 at the underside thereof.

It will be seen from FIG. 2 that this Figure indicates two alternatives of the switching device 18 which are arranged on the base portion 42 laterally beside the projection of the operating element 14 on to the base portion 42. One switching device 18 is actuated directly by a suitable end portion on the actuating member 16, while the other switching device 18 is actuated by a lateral projection on the actuating member 16.

It will be noted that the operating element 14 is of a size in terms of surface area which is as large as possible in relation to the base portion 42, so that the switching device 18 is appropriately actuated, virtually irrespective of where a weight loading is applied to the assembly 10 and more specifically the seat cushion 12 thereof.

Reference is now made to FIG. 3 showing a side view of a driving seat 50 for a vehicle such as a commercial vehicle, comprising a seat plate assembly 10 or squab portion, and a backrest 52 which is suitably connected thereto. FIG. 3 also clearly shows the operating element 14 which is loosely held by means of tongues 22 projecting rearwardly from its transverse edge 20, in associated openings 44 in the base portion 42, thus providing for pivotable mounting of the operating element 14 in relation to the base portion 42. It will be appreciated that the seat cushion indicated at 12 in FIG. 1 is not shown in FIG. 3.

It will be appreciated that the above-described structures have been set forth solely by way of example and illustration of the principles of the present invention and that various modifications and alterations may be made therein without thereby departing from the spirit and scope of the invention.

What is claimed is:

1. A seat plate assembly for a vehicle, comprising a base portion, a seat cushion means on the base portion, an at least substantially flat operating element resiliently movably disposed between the base portion and the seat cushion means, a switching means actuable by movement of the operating element for switching a functional device of the vehicle into a first condition upon a given minimum weight loading on the assembly and for switching the functional device into a second condition when the assembly is relieved of load, at least one drive portion at the underside of the operating element and having at least one actuating wedge surface, an elongate actuating member for operating the switching means and having at least one opening co-operable with said actuating surface of said drive portion, whereby upon downward movement of said operating element and therewith said drive portion under a weight loading on said assembly said actuating surface presses against an edge of the associated opening in the elongate actuating member and displaces the elongate actuating member in the longitudinal direction thereof for actuation of the switching means, and a spring means connected to the elongate actuating member and adapted to be mechanically stressed when the elongate actuating member is displaced for actuation of the switching means.

2. An assembly as set forth in claim 1 including means mounting the operating element on the base portion pivotably movably relative thereto about a pivot axis which is oriented in the transverse direction of the assembly, and a spring means operatively disposed between the base portion and the operating element, the elongate actuating member being spaced from said pivot axis of the operating element and arranged in at least approximately parallel orientation therewith beneath the operating element.

3. An assembly as set forth in claim 2 wherein to provide said pivot axis the operating element has at least first and second tongues aligned with each other in the transverse direction of the assembly and the base portion has openings aligned with each other in the transverse direction of the assembly, for insertion therein of said tongues.

4. An assembly as set forth in claim 1 including means for linearly movably guiding the elongate actuating member on the base portion, wherein in the projection of the operating element on to the base portion said switching means is disposed laterally beside the operating element on said base portion.

5. In a seat for a vehicle, a squab assembly comprising: a base porton; a seat cushion means disposed above the base portion; an at least substantially flat operating element disposed between the base portion and the seat cushion means and movable substantially perpendicularly relative to said base portion under the effect of a weight loading applied to said seat cushion means; an actuating arrangement which is operatively disposed between said operating element and said base portion and comprises at least one drive portion having at least one wedge actuating surface, and an elongate actuating member having a portion co-operable with said actuating surface, the elongate actuating member being displaceable between first and second positions by the co-operation of the actuating surface and the drive portion in response to vertical movement of the operating element; a switching means actuable by movement of said elongate actuating member between its said positions for switching a functional device of the vehicle into a first condition upon a given minimum weight loading on the seat cushion means causing downward displacement of said operating element, and for switching the functional device into a second condition in the absence of said loading on the seat cushion means; and spring means connected to said elongate actuating member and adapted to urge same towards one said position thereof, the arrangement being such that when the given minimum weight loading is applied to said cushion means said operating element is urged downwardly and said actuating surface of said drive portion engages said portion of said elongate actuating member to displace same to actuate said switching means.

* * * * *